US006300463B1

(12) United States Patent
Figuly et al.

(10) Patent No.: US 6,300,463 B1
(45) Date of Patent: Oct. 9, 2001

(54) THERMOPLASTIC ELASTOMERS

(75) Inventors: Garret Daniel Figuly, Wilmington, DE (US); Marc Bruce Goldfinger, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/477,590

(22) Filed: Jan. 4, 2000

Related U.S. Application Data

(60) Provisional application No. 60/117,686, filed on Jan. 29, 1999.

(51) Int. Cl.[7] .......................... C08G 73/00; C08L 67/00; C08L 77/00
(52) U.S. Cl. .......................... 528/310; 528/272; 528/288; 528/300; 528/302; 528/322; 528/332; 528/335; 528/336; 428/357; 428/394; 428/395; 525/92 A; 525/420; 525/425
(58) Field of Search ................... 525/92 A, 420, 525/425; 528/272, 288, 300, 302, 310, 322, 332, 335, 376; 428/357, 394, 395

(56) References Cited

U.S. PATENT DOCUMENTS

| 4,230,838 | 10/1980 | Foy et al. | 525/408 |
|---|---|---|---|
| 4,331,786 | 5/1982 | Foy et al. | 525/408 |
| 4,906,729 | 3/1990 | Greene et al. | 528/272 |
| 4,937,314 | 6/1990 | Greene | 528/272 |
| 5,000,899 | 3/1991 | Dreibelbis et al. | 264/205 |
| 5,444,120 | 8/1995 | Liedloff | 525/66 |
| 5,874,522 | * 2/1999 | Figuly et al. | 528/288 |

FOREIGN PATENT DOCUMENTS

| 2 555 186 | 5/1985 | (FR) | C08G/69/44 |
|---|---|---|---|

* cited by examiner

Primary Examiner—P. Hampton-Hightower

(57) ABSTRACT

Thermoplastic elastomeric polymers which contain polyether blocks having tetramethylene ether repeat units, and polyamide blocks, have improved elastomeric properties such as higher unload power and lower tensile set, when the polyether blocks also contain 2-alkyltetramethylene ether repeat units. The polymers are useful as molding resins and for fibers.

9 Claims, No Drawings

THERMOPLASTIC ELASTOMERS

This is application claims priority benefit of Provisional Application No. 60/117,686 filed Jan. 29, 1999, now pending.

FIELD OF THE INVENTION

Thermoplastic elastomeric polymers which contain polyether blocks having tetramethylene ether repeat units, and polyamide blocks, have improved elastomeric properties such as higher unload power and lower tensile set, when the polyether blocks also contain 2-alkyltetramethylene ether repeat units.

BACKGROUND OF THE INVENTION

Thermoplastic elastomers (TPE) are a class of polymers which combine the properties of two other classes of polymers, namely thermoplastics which may be reformed upon heating, and elastomers which are rubber-like polymers. One form of TPE is a block copolymer, usually containing some blocks whose polymer properties usually resemble those of thermoplastics, and some blocks whose properties usually resemble those of elastomers. Those blocks whose properties resemble thermoplastics are often referred to as "hard" blocks, while those blocks whose properties resemble elastomers are often referred to as "soft" blocks. In such TPEs, the hard blocks are believed to take the place of chemical crosslinks in traditional thermosetting elastomers, while the soft blocks provide the rubber-like properties.

The polymeric nature of the hard and soft blocks of a TPE, as well as the number of such blocks and their size (length) determines to a great extent the properties of the resulting TPE. For example, longer soft blocks usually lead to TPEs having lower initial tensile modulus, while a high percent of hard blocks leads to polymers with higher initial tensile modulus. Other properties may be affected as well. Thus manipulation on the molecular level changes the properties of TPE's, and improved TPEs are constantly being sought.

U.S. Pat. Nos. 4,331,786 and 4,230,838 describe certain poly(ether-ester-amides) which may contain polyether blocks containing tetramethylene ether repeat units. No specific mention is made of polymers containing 2-alkyltetramethylene ether repeat units.

U.S. Pat. No. 4,937,314 describes poly(ether-esters) in which a polyether soft block contains tetramethylene ether and 2-methyltetramethylene ether repeat units. No mention is made of the use of such soft blocks in poly(ether-ester-amides).

What are needed are improved thermoplastic elastomers which do not have the deficiencies of the prior art. Other objects and advantages of the present invention will become apparent to those skilled in the art upon reference to the detailed description of the invention which hereinafter follows.

SUMMARY OF THE INVENTION

This invention concerns a polymer, comprising, the repeat units:

(a) $-R^2C(O)O\{[-CH_2)_4O-]_m[-CH_2CHR^1CH_2CH_2O-]_n\}C(O)R^2-$ (I); and (b) one or both of (i) $-C(O)[-NHR^3NHC(O)R^2C(O)-]_qHNR^3NHC(O)-$ (II), and (ii) $-C(O)[-NHR^4C(O)-]_tNH-$ (III);

wherein:

each $R_1$ independently is alkyl containing 1 to 6 carbon atoms;

each $R^2$, $R^3$ and $R^4$ independently is saturated hydrocarbylene or substituted saturated hydrocarbylene containing 2 to 20 carbon atoms, or hydrocarbylidene or substituted hydrocarbylidene containing 1 to 20 carbon atoms;

m is an integer from 5 to about 150;

n is 0 or an integer of 1 to about 50, provided that the overall ratio of m/n in said polymer is about 3 to about 30;

q is 0 or an integer of 1 to about 20; and t is 0 or an integer of 1 to about 20.

DETAILED DESCRIPTION OF THE PREFERRED EMBODIMENTS

Certain terms used herein are defined below:

By "saturated hydrocarbylene" is meant a moiety containing only carbon and hydrogen having two open valencies, one each to two different carbon atoms. The carbon atoms containing the open valencies are saturated, i.e., have no multiple bonds to those carbon atoms, but these carbon atoms may be parts of other groups such as rings. The other part of the saturated hydrocarbylene group, if any, may contain multiple bonds such as olefinic bonds or aromatic rings.

By hydrocarbyl is meant a univalent radical containing only carbon and hydrogen.

By "hydrocarbylidene" is meant a group containing only carbon and hydrogen and having two free valencies to a single carbon atom which itself has no multiple bonds attached to it. The hydrocarbylidene carbon atom may be part of another structure, such as part of a ring. Other parts of the hydrocarbylidene group may contain multiple bonds, such as olefinic bonds or aromatic rings.

By a group or compound being "substituted" herein means that the groups may contain one or more atoms other than carbon and hydrogen which are, or are part of, functional groups. These functional groups should not interfere with the formation of the desired polymers, and such groups are generally known one of ordinary skilled in art to the artisan. Suitable functional groups include ether, halo, sulfone, and nitrogen containing aromatic heterocyclic rings.

The polymers described herein have certain repeat units which form part of the polymer. Small amounts of other repeat units may also be present in these polymers so long as the essential character of the polymer is not changed. Among these other repeat units may be branching agents, which are tri- or higher functional compounds such as triamines, trihydroxy compounds, or tricarboxylic acids, even though these branching agents may change the rheological properties of the resulting polymer. Trifinctional compounds are preferred as branching agents.

One of these repeat units is (I), which forms the soft block of the polymer. As will be understood by the artisan, (I) is formed by a random copolymerization of tetrahydrofuran (THF) and 3-alkyltetrahydrofuran which leads to subrepeat units $[-(CH_2)_4O-]$ and $[-CH_2CHR^1CH_2CH_2O-]$, respectively. Therefore, in (I) $[-(CH_2)_4O-]$ and $[-CH_2CHR^1CH_2CH_2O-]$ are randomly placed within the structure. Since $[-CH_2CHR^1CH_2CH_2O-]$ is the minor molar fraction of (I), it is possible that in certain (I) units, there will be no subrepeat units of the formula $[-CH_2CHR^1CH_2CH_2O-]$. In another possible combination, a homopolymer of the subrepeat unit [—(CH$_2$)$_4$O—] is combined with a copolymer of both of the subrepeat units of (I). However in any event on average (I) must contain sufficient subrepeat units [—CH$_2$CHR$^1$CH$_2$CH$_2$O—] so that the limitation on the ratio m/n is met.

In (I) R$^1$ may be methyl, ethyl, i-propyl, etc., but it is preferred that R$^1$ is methyl. It is also preferred that m is about 7 to about 50, and/or the overall ratio of m/n is 4 to about 20.

In all of the repeat units it is preferred that R$^2$, R$^3$ and R$^4$ are each independently saturated hydrocarbylene, more preferably alkylene or cycloalkylene, and it is most preferred —(CH$_2$)$_r$— wherein r is 2 to 18. Useful saturated hydrocarbylene groups (which may be alkylene or cycloalkylene) include 2-methyl-1,4-pentylene, 1,6-hexylene, 1,4-butylene, m- or p-xylylene, 1,4-cyclohexylene, 1,12-dodecylene, 1,2-ethylene, 1,10-decylene and 1,8-octylene. Especially preferred combinations of R$^2$ and R$^3$ are: when R$^2$ is 1,10-decylene, R$^3$ is 1,6-hexylene; and when R$^2$ is 1,4-butylene and R$^3$ is 1,10-decylene.

In (II) it is preferred that q is 0 to about 6, and in (III) it is preferred that t is 0 or 1 to about 6. While (II) and (III) may be present in the same polymer, it is preferred that either (II) or (III) is present in the polymer.

Because of the end groups on repeat units (I), (II) and (III), it will be recognized that within the poly(ether-ester-amide) the end groups of (II) and (III) must be bound to the end groups of (I), so that in essence the blocks of (I) will alternate (if enough of such blocks are present) with blocks of (II) and/or (III). While the end groups of the overall polymer molecules are not critical, they will normally be monofunctional groups such as —OH, —NH$_2$, CO$_2$H.

These poly(ether-ester-amides) may be made by known methods, see for instance U.S. Pat. Nos. 4,230,838, 4,331,786, 4,252,920, 4,208,493, and 5,444,120, and S. Fakirov, et al., Makromol. Chem., vol. 193, p. 2391–2404 (1992), all of which are hereby included by reference, and as described in the Examples herein. The principal difference between polymers made in many of these references and those claimed herein is the presence of the [—CH$_2$CHR$^1$CH$_2$CH$_2$O—] subunit in the polyether blocks. This subunit may be included within the polyether diol starting material for these blocks simply by including the corresponding 3-alkyltetrahydrofuran in the polymerization of tetrahydrofuran which forms the other subunit of the polyether diol.

The poly(ether-ester-amides) described herein are useful wherever thermoplastic elastomers are used, for instance for molding resins for automotive and electrical uses, and for films and fibers. Typically they have much higher "unload power" (see below) and much better elastic recovery (lower tensile set) after stretching than similar polymers not containing th [—CH$_2$CHR$^1$CH$_2$CH$_2$O—] subunit, especially when recovering from high elongation such as 290% or more. These improvements in are much larger than would be expected by a comparison with analogous poly(ether-ester) elastomers.

This is particularly important when used as the spandex (elastic) fibers in fabrics such as undergarments and bathing suits. Fibers may be made from the polymers described herein by standard methods, see for instance the Examples below and/or H. Mark, et al., Ed., Encyclopedia of Polymer Science and Engineering, Vol. 6, John Wiley & Sons, New York, 1986, pages 733–755 and 802–839.

In the Examples, the following abbreviations are used:

η$_{inh}$—inherent viscosity

DSC—Differential Scanning Calorimetry
E—percent tensile elongation to break
HS—hard segment
M—initial tensile modulus
Mn—number average molecular weight
Mw—weight average molecular weight
PTMEG—poly(tetramethyleneether) glycol
RT—room temperature
SS—soft segment
T$_{(b)}$—tenacity (to break)
Tg—glass transition temperature
THF—tetrahydrofuran
Tm—melting point
UP—unload power General Procedures The number average molecular weight of the soft segment glycol was determined by reacting the glycol with an excess of acetic anhydride in pyridine and then back-titrating with sodium hydroxide to measure the amount of acetic acid produced.

Polymer melting temperature was measured with a DuPont Model 910 Differential Scanning Calorimeter, and is defined as the temperature at the lowest point of the endotherm of transition to an isotropic melt observed on the second heating cycle, using a heating rate of 10° C./min.

The weight percent hard segment was calculated according to the following formula:

$$\% \ HS = \frac{100(wHS)((MHS-34)/MHS)}{(wHS)((MHS-34)/MHS) + (wSS)((MSS-2)/MSS)}.$$

where w is the initial weight in grams

M is molecular weight in amu

HS is hard segment

SS is soft segment

Inherent Viscosity measurements were made following ASTM Method 2857-70. The polymer samples were dried at 70° C. for 3 hours before weighing. Samples were run at 30° C. using a 0.5% solution in m-cresol. To improve efficiency, accuracy, and precision an AutoVisc® Automatic Measuring System (Design Scientific, Gainesville, Ga., U.S.A., now believed to be manufactured by Cannon Instruments, State College, PA, U.S.A. under the name AutoVisc® I) automated viscosity measuring system was used. A high density infrared fiber optic detection system was used in place of a human operator and an air bath was used in place of the oil or water bath normally used to provide constant temperature. The Auto Visc exceeds the accuracy specifications of ASTM D-445, "Standard Test Method For Kinematic Viscosity of Transparent and Opaque Liquids".

General Fiber Spinning Procedure

To perform the melt spinning, a cylindrical cell of 2.2 cm (⅞ inch) inside diameter and 12.7 cm (5 inch) length was employed. The cell was equipped with a hydraulically driven ram that was inserted on top of the sample. The ram had a replaceable Teflon® tip designed to fit snugly inside the cell. An annular electric heater which surrounded the lower quarter of the cell was used for controlling cell temperature. A thermocouple inside the cell heater recorded the cell temperature. Attached to the bottom of the cell was a spinneret, the interior of which included a cylindrical passage, measuring 1.27 cm (0.5 inch) in diameter and 0.64 cm (0.25 inch) in length, which was connected to the bottom of the cell cavity. The spinneret cavity contained stainless steel filters of the following mesh, inserted in the following order, starting from the bottom (i.e., closest to the exit): 50, 50, 325, 50, 200, 50, 100, 50. A compressible annular aluminum seal was fitted to the top of the "stack" of filters. Below the filters was a cylindrical passage of about 2.5 cm (1 inch) length and 0.16 cm (1/16 inch) interior diameter, the lower of which was tapered (at an angle of 60 degrees from the vertical) to meet with an outlet orifice measuring 0.069 cm (0.027 inch) in length and 0.023 cm (0.009 inch) in inside diameter. The spinneret temperature was controlled by a separate annular heater.

General Fiber Testing Procedures

Tenacity at break, T, in grams per denier (gpd) and percent elongation at break, E, were measured on an Instron® Tester equipped with a Series 2712 (002) Pneumatic Action Grips equipped with acrylic contact faces.

"Unload power" was measured in dN/tex$_{eff}$. One filament, a 2-inch (2.5 cm) gauge length, was used for each determination. Separate measurements were made using zero-to-100% and/or zero-to-200% elongation cycles. Unload power (i.e., the stress at a particular elongation) was measured after the samples have been cycled five times at a constant elongation rate of 1000% per minute and then held at 100 or 200% extension for half a minute after the fifth extension. While unloading from this last extension, the stress, or unload power, was measured at various elongations. Unload powers are reported herein using the general form 'UP x/y' where x is the percent elongation to which the fiber was cycled five times and y is the percent elongation at which the stress, or unload power, was measured.

The % set was measured from the stress/strain curve recorded on chart paper.

EXAMPLE 1

Into a 350 mL resin kettle fitted with a paddle stirrer with torque meter, distillation head, nitrogen inlet, vacuum pump, and Wood's metal heating bath was added 82 g Pebax® 3533, (a poly(ether-ester-amide available from Elf-Atochem, and believed to consist of 21.2 wt. % nylon-12, 74.9 wt % polytetramethylene ether glycol of number average molecular weight 2150, and 3.9 wt. % adipoyl units, and having a melting point of 145° C.), 18 g poly (tetramethylene-co-2-methyltetramethylene)glycol (Mw= 3685, 2-methylTHF content 15 mole percent), 3.7 g (0.016 mol) dodecanedicarboxylic acid, and 0.5 g Ethanox® 330 (antioxidant, available from Ethyl Corp.). The vessel was evacuated and purged with nitrogen 5 times, after which it was immersed into the Wood's metal heating bath which was preheated to 250° C. The ingredients were allowed to melt with slow agitation, after which time the reaction mixture was vigorously agitated for approximately 1 h. After that time vacuum was slowly applied to the reaction vessel at a rate which allowed full vacuum to be reached in approximately 50 to 60 min. During this evacuation cycle water was collected in the distillation head. The kettle was then filled with nitrogen and 1 mL 5% Tyzor® TBT (available from E.I. du Pont de Nemours and Company, Wilmington, Del., U.S.A.) dissolved in butanediol was added to the reaction kettle. Vacuum was then quickly reapplied until full vacuum (27 Pa) was established. The polymerization was then agitated for approximately 2.5 h. During this time agitation speed was gradually lowered as melt viscosity increased to avoid severe agglomeration of the polymer on the agitator blade and shaft. After this time the polymer melt viscosity was very high and the reaction was terminated. The polymer was scooped out of the resin kettle to yield 82.7 g of a straw-yellow elastomeric polymer: $\eta_{inh}$=1.487 in m-cresol at 30° C.; (DSC): Tg: −75.19° C.; Tm: 8.66° C., ΔH: 32.13 J/g (soft segment); Tm: 133.97° C., ΔH: 9.76 J/g (hard segment).

The resulting polymer was spun into single filament fiber using a spin cell temperature of 270° C. and a spinneret temperature of 280° C. The fiber was first taken up on spin rolls moving at 40 m/min and then drawn on rolls moving either at 160 m/min or 80 m/min to produce a draw ratio of either 4× or 2× respectively. Deniers ranging from 40 to 60 were obtained. When a sample of fiber was stretched to 50% and subjected to boiling water no breaking was observed. Other samples of fiber were tested for physical properties and produced the following results:

| Draw | T | E | M | UP$^{100/50}$ | % Set$^{100}$ | UP$^{200/100}$ | % Set$^{200}$ |
|---|---|---|---|---|---|---|---|
| 4× | 1.01 | 273 | 0.285 | 44.88 | 10 | 11.88 | 85 |
| 2× | 0.506 | 554 | 0.128 | 32.92 | 7 | 25.74 | 30 |

COMPARATIVE EXAMPLE A

Pebax® 3533 elastomeric polymer was spun into single filament fiber using a spin cell temperature of 225° C. and a spinneret temperature of 230° C. The fiber was first taken up on spin rolls moving at 40 m/min and then drawn on rolls moving either at 160 m/min or 80 m/min to produce a draw ratio of either 4× or 2× respectively. Deniers ranging from 50 to 65 were obtained. When a sample of fiber was stretched to 50% and subjected to boiling water, the sample did not break. Other samples of the fiber were tested for physical properties and produced the following results:

| Draw | T | E | M | UP$^{100/50}$ | % Set$^{100}$ | UP$^{200/100}$ | % Set$^{200}$ |
|---|---|---|---|---|---|---|---|
| 4× | 1.426 | 236 | 0.413 | 38.5 | 17 | 0.68 | 113 |
| 2× | 0.832 | 477 | 0.188 | 35.5 | 9 | 18.2 | 63 |

EXAMPLE 2

Hard segment was prepared as follows: into a 250 mL three-necked round bottom flask equipped with an overhead stirrer, nitrogen inlet, distillation head, and heating mantle was added 30 g (0.149 mol) 11-aminoundecanoic acid and 30.3 g (0.150 mol) 1,10-decanedicarboxylic acid. The ingredients were heated at 250° C. with stirring for ~1 h, after which time vacuum was applied. The level of vacuum was gradually increased over approximately 1 h to a pressure of 24 kPa. The melt was then stirred at 250° C. under the desired vacuum for an additional 2 h. The flask was then cooled with dry ice and the flask was broken to remove the amide hard segment. Final yield was 51.6 g (89.9%) of white material: $\eta_{inh}$: 0.1540 in m-cresol at 30° C.; (DSC): Tm: 86.87° C., ΔH: 77.41 J/g; Tm: 133.62° C., ΔH: 42.23 J/g.

Into a 350 mL resin kettle fitted with a paddle stirrer with torque meter, distillation head, nitrogen inlet, vacuum pump, and Wood's metal heating bath was added 14.7 g (0.0381 mol) of the hard segment previously prepared; 80.0 g (0.0381 mol) poly(tetramethylene-co-2-methyltetramethylene)glycol (Mw ~2100, 8 mol % 2-methyltetramethyleneglycol); 2.0 g Ethanox® (antioxidant), and 0.3 g Tyzor® TBT (catalyst). The vessel was evacuated and purged with nitrogen at least 3 times, after which it was immersed in the Wood's metal bath which was preheated to 260° C. After approximately 90 min of stirring at a temperature of 250–260° C. vacuum was slowly applied at a rate which allowed full vacuum (33 Pa) to be reached in approximately 45 min. The polymerization mixture was then agitated for another 4 h. During this time agitation speed was gradually lowered as melt viscosity increased to avoid severe agglomeration of the viscous polymer on the agitator shaft and blade. When the polymer melt viscosity was very high the reaction was terminated. The polymer was scooped out of the resin kettle to yield 82.1 g of a pale straw-yellow elastomeric polymer: $\eta_{inh}$: 1.082 in m-cresol at 30° C.; (DSC): Tg: –83.82° C.; Tm: 7.02° C., $\Delta$H: 37.7 J/g (soft segment); no hard segment melting point was observed.

The resulting elastomeric polymer was spun into single filament fiber using a spin cell temperature of 200° C. and a spinneret temperature of 200° C. The fiber was first taken up on spin rolls moving at 40 m/min and then drawn on rolls moving either at 160 m/min or 80 m/min to produce a draw ratio of either 4× or 2× respectively. Deniers ranging from 15 to 45 were obtained. When a sample of fiber was stretched to 50% and subjected to boiling water, the sample broke. Other samples of the fiber were tested for physical properties and produced the following results:

| Draw | T | E | M | $UP^{100/50}$ | $\%\ Set^{100}$ | $UP^{200/100}$ | $\%\ Set^{200}$ |
|---|---|---|---|---|---|---|---|
| 4× | 0.378 | 355 | 0.032 | 18.9 | 3 | 27.8 | 9 |
| 2× | 0.364 | 449 | 0.036 | 23.6 | 3 | 33.9 | 10 |

EXAMPLE 3

Hard segment was prepared as follows: into a 250 mL three-necked round bottom flask equipped with an overhead stirrer, nitrogen inlet, distillation head, and heating mantle was added 30 g (0.149 mol) 11-aminoundecanoic acid and 34.5 g (0.150 mol) 1,12-dodecanedicarboxylic acid. The ingredients were heated at 250° C. with stirring for ~1 h, after which time vacuum was applied. The level of vacuum was gradually applied over approximately 1 h to a pressure of 20 kPa. The melt was then stirred at 245–250° C. under the desired vacuum for an additional 2 h. The flask was then cooled with dry ice and the flask was broken to remove the amide hard segment. Final yield was 54.4 g (88%) of white material: $\eta_{inh}$: 0.7303 in m-cresol at 30° C.; (DSC): Tm: 90.15° C., $\Delta$H: 121.4 J/g.

Into a 350 mL resin kettle fitted with a paddle stirrer with torque meter, distillation head, nitrogen inlet, vacuum pump, and Wood's metal heating bath was added 23.6 g (0.0571 mol) of the hard segment previously prepared; 80.0 g (0.0571 mol) poly(tetramethylene-co-2-methyltetramethylene)glycol (Mw ~1400, 14% 2-methyltetramethyleneglycol); 2.0 g Ethanox® (antioxidant), and 0.3 g Tyzor® TBT (catalyst). The vessel was evacuated and purged with nitrogen at least 3 times, after which it was immersed in the Wood's metal bath which was preheated to ~250° C. After approximately 75 min of stirring at a temperature of 245–250° C. vacuum was slowly applied at a rate which allowed full vacuum (33 Pa) to be reached in approximately 45 min. The polymerization mixture was then agitated for another 4 h. During this time agitation speed was gradually lowered as melt viscosity increased to avoid severe agglomeration of the viscous polymer on the agitator shaft and blade. When the polymer melt viscosity was very high the reaction was terminated. The polymer was scooped out of the resin kettle to yield 86.2 g of a straw-yellow elastomeric polymer: $\eta_{inh}$: 1.366 in m-cresol at 30° C.; (DSC): Tg: –69.8° C.; Tm: –13.27° C., $\Delta$H: 15.98 J/g (soft segment); no hard segment melt point was observed.

The resulting elastomeric polymer was spun into single filament fiber using a spin cell temperature of 185° C. and a spinneret temperature of 195° C. The fiber was first taken up on spin rolls moving at 40 m/min and then drawn on rolls moving either at 160 m/min or 80 m/min to produce a draw ratio of either 4× or 2× respectively. A sample was collected which was taken up at 40 m/min and was not drawn. Deniers ranging from 20 to 65 were obtained. When a sample of fiber was stretched to 50% and subjected to boiling water, the sample broke. Other samples of the fiber were tested for physical properties and produced the following results:

| Draw | T | E | M | $UP^{100/50}$ | $\%\ Set^{100}$ | $UP^{200/100}$ | $\%\ Set^{200}$ |
|---|---|---|---|---|---|---|---|
| 4× | 0.230 | 444 | 0.069 | 28.4 | 4 | 44.6 | 10 |
| 2× | 0.224 | 493 | 0.066 | 26.7 | 5 | 36.5 | 5 |
| 0× | 0.138 | 735 | 0.057 | 20.0 | 5 | 27.4 | 13 |

In the following Examples the data reported herein, T, E, UP, and % Set are the average of three determinations for fiber samples drawn at a 4× draw ratio.

EXAMPLES 4–10

Examples 4–10 describe the procedure used to prepare the hard segment materials which were subsequently used to prepare the elastomers.

The hard segments were prepared in standard three-neck flasks. One joint was fit with a take-off arm leading to a cold trap to condense volatile reaction by-products. The cold trap in turn was connected to a manifold capable of delivering an inert gas such as argon or nitrogen or providing a vacuum. The reaction was stirred using a mechanical agitator fitted with a paddle stirrer and was interfaced with a Cole-Parmer Servodyne® Controller 4445-30 torquemeter. The torquemeter allowed each run to be reproducibly terminated at a predefined torque reading.

In a typical run a three neck flask was charged with the diamine or aminoacid and the dicarboxylic acid in the ratios prescribed in Table 1. A nitrogen atmosphere was introduced by repeated (3×) vacuum evacuation and nitrogen backfill. The reaction was heated at 245–250° C. for three hours and allowed to cool to RT under a nitrogen atmosphere. Alternately the reaction can be run at 210° C. for the first hour to avoid bumping, followed by two hours at 240–250° C.

After cooling to RT under a nitrogen atmosphere, the hard segment was isolated as a colorless solid. The material could be easily broken into small pieces for weighing and use in subsequent elastomer preparation examples. Isolated yields of the hard segments typically ranged from 85–95%.

TABLE 1

| Ex. No. | Amino acid | Diacid | Diamine | Mole Ratio Diacid/ Diamine | Tm °C., Onset | ΔH J/g |
|---|---|---|---|---|---|---|
| 4 | | sebacic | 1,6-hexanediamine | 2/1 | 192 | 30.7 |
| 5 | | DDDA[1] | 1,6-hexanediamine | 2/1 | 166, 188 | 4.5, 20.1 |
| 6 | | adipic | 1,6-hexanediamine | 2/1 | 214 | 31.6 |
| 7 | | DDDA | m-xylylenediamine | 2/1 | 146 | 8.7 |
| 8 | 11-AUA[2] | adipic | | 3.8/1[3] | 135 | 62.2 |
| 9 | | DDDA | 1,6-hexanediamine | 3/2 | 123–210 | 96.7 |
| 10 | | DDDA | m-xylylenediamine | 3/2 | 109, 119 | 3.4, 40.5 |

[1]1,12-Dodecanedioic acid
[2]11-Aminoundecanoic acid
[3]Mole ratio aminoacid/diacid

EXAMPLES 11–29 AND COMPARATIVE EXAMPLES B–G

These Examples describe the of preparation of the elastomers wherein a preformed polyamide hard segment was used.

The experimental set-up was similar to that described in Example 4, except that a two-piece resin kettle was used. The 80 mm diameter, 500 mL capacity kettle bottom was connected to a three-neck kettle top with an o-ring and clamp. The resin kettle was similarly connected to a manifold through a cold trap and was agitated by a mechanical stirrer interfaced to a torquemeter.

Example 11 is used to illustrate the general procedure. A resin kettle was charged with 20.0 g (41.3 mmol) of the hard segment of Example 4, 89.50 g (39.3 mmol) of a polyether soft segment with Mn=2276 g/mol and 14% of repeat units containing methyl side-groups, 0.40 g Ethanox® 330 antioxidant, and 0.220 g (0.2 wt. %) butylstannoic acid catalyst. The flask was evacuated and backfilled with $N_2$ gas three times to create an inert atmosphere. The reaction was heated for one h at 210° C. and then 90 min at 235° C. under $N_2$. At that point vacuum was introduced, and the pressure was lowered from atmospheric to 1.3–5.3 Pa over 90 min. The reaction was continued under vacuum at 235–240° C. until the torquemeter reached a predefined value. The flask was backfilled with $N_2$ and the polymer was removed while still hot. Isolated yields typically ranged from 75–90%.

The Examples reported in Tables 2–6 below were prepared according to the general procedure described in Example 11, above. These Tables are organized according to the hard segment composition. Different Examples within a given Table are for different soft segment Mn's and methyl branch contents.

Table 2 describes Examples which had the hard segment prepared in Example 4. For Example 11, a 5% excess of hard segment was used, accounting for the higher hard segment content. Example 12 has a lower % hard segment because a 1:1 molar ratio of the hard and soft segments was used. The difference between Examples 14 and 15 is that Example 15 was prepared using 0.1 wt. % catalyst rather than the usual 0.2 wt. %. For Example 16, a soft segment MW of 1914 g/mol was achieved by using a mixture of MW 1400 and MW 2276 soft segments. This modification was made to achieve a desired % hard segment content.

The Examples listed in Table 3 were all done using the hard segment of Example 5. Example 18 contains 0.1 wt. % tris(2-aminoethyl)amine (TREN) as a crosslinking agent. Example 19 contains 0.33 wt. % TREN.

The Examples listed in Table 4 were done with the hard segment from Example 7.

The Examples listed in Table 5 were done with a hard segment of Example 8. Comparative Example F was prepared using tetrabutyl titanate (TBT) as catalyst.

The Examples listed in Table 6 were done with the hard segment of Example 9.

It should be noted that elastomers were also prepared using the hard segments of Example 6. The resultant elastomers exhibited poor elastic properties due to gross phase separation. In the case of the hard segment of Example 6 the gross phase separation was evident as the elastomer had a grainy feel.

TABLE 2

| Ex. No. | Soft Segment | | | Inh. Visc. | H.S. Tm | H.S. ΔH | T | E | Initial Mod. | % Set | | | | | % Set |
|---|---|---|---|---|---|---|---|---|---|---|---|---|---|---|---|
| | Mn | % Methyl | % HS | (dl/g) | (° C., Onset) | (J/g) | (gpd) | (%) | (gpd) | $UP^{100/50}$ | $UP^{100/33}$ | 100 | $UP^{200/100}$ | $UP^{200/50}$ | 200 |
| 11 | 2276 | 14 | 17.2 | 1.7406 | 198.7 | 3.32 | 0.410 | 415 | 0.096 | 26.71 | 15.85 | 4.3 | 32.48 | 10.75 | 13.3 |
| 12 | 2276 | 14 | 16.5 | 1.9207 | 192.8 | 2.83 | 0.400 | 404 | 0.080 | 28.53 | 16.84 | 5.3 | 36.30 | 11.59 | 16.3 |
| 13 | 1472 | 14 | 24.4 | 1.8420 | 189.4 | 5.23 | 0.559 | 272 | 0.204 | 44.87 | 23.99 | 6.0 | 40.37 | 9.20 | 24.3 |
| 14 | 2098 | 8 | 18.4 | 1.5806 | 197.5 | 2.70 | 0.792 | 281 | 0.1910 | 39.99 | 22.17 | 7.7 | 32.37 | 8.22 | 27.0 |
| 15 | 2098 | 8 | 18.4 | 1.5194 | 200.4 | 4.50 | 0.590 | 385 | 0.1228 | 25.96 | 14.19 | 7.3 | 26.32 | 6.61 | 24.3 |
| 16 | 1914 | 14 | 19.8 | 1.9441 | 192.1 | 3.67 | 0.507 | 323 | 0.145 | 34.91 | 19.09 | 5.0 | 37.93 | 11.08 | 18.7 |
| B | 2000 | 0 | 19.2 | 1.8859 | 205.4 | 2.74 | 2.712 | 146 | 2.3142 | 24.38 | 24.38 | 38.6 | | | |

TABLE 3

| Ex. No. | Soft Segment Mn | % Methyl | % HS | Inh. Visc. (dl/g) | H.S. Tm (° C., onset) | H.S. ΔH (J/g) | T (gpd) | E (%) | Initial Mod. (gpd) | $UP^{100/50}$ | $UP^{100/33}$ | % Set 100 | $UP^{200/100}$ | $UP^{200/50}$ | % Set 200 |
|---|---|---|---|---|---|---|---|---|---|---|---|---|---|---|---|
| 17 | 2276 | 14 | 19.0 | 1.9861 | 192.5 | 2.74 | 0.470 | 357 | 0.111 | 37.18 | 21.84 | 5.7 | 42.51 | 14.11 | 15.7 |
| 18 | 2276 | 14 | 19.0 | 1.5049 | 192.4 | 2.58 | 0.618 | 334 | 0.179 | 38.06 | 20.47 | 5.7 | 37.33 | 10.24 | 19.0 |
| 19 | 2276 | 14 | 20.3 | 1.1639 | 173.5 | 3.33 | 0.347 | 296 | 0.0769 | 28.16 | 17.01 | 6.0 | 35.86 | 12.69 | 15.0 |
| 20 | 2098 | 8 | 20.2 | 2.0087 | 185.4 | 3.02 | 0.748 | 308 | 0.175 | 50.38 | 29.72 | 8.0 | 48.42 | 15.55 | 22.3 |
| 21 | 1472 | 14 | 25.7 | 1.3329 | 179.9, 189.8 | 0.86, 1.51 | 0.542 | 340 | 0.194 | 44.59 | 24.23 | 7.0 | 44.13 | 8.77 | 28.7 |
| 22 | 1:1 2098/2000 | 8/0 | 20.6 | 1.8010 | 141.9 | 1.64 | 1.218 | 204 | 0.3628 | 47.86 | 19.84 | 15.0 | would not cycle to 200% | | |
| C | 2000 | 0 | 20.2 | 1.5734 | 193.3 | 2.25 | 1.402 | 186 | 0.7279 | 21.48 | 0.84 | 38.0 | 0.05 | −0.07 | 131.3 |

TABLE 4

| Ex. No. | Soft Segment Mn | % Methyl | % HS | Inh. Visc. (dl/g) | H.S. Tm (° C.,) onset | H.S. ΔH (J/g) | T (gpd) | E (%) | Toughness (gpd) | Initial Mod. (gpd) | $UP^{100/50}$ | $UP^{100/33}$ | % Set 100 | $UP^{200/100}$ | $UP^{200/50}$ | % Set 200 |
|---|---|---|---|---|---|---|---|---|---|---|---|---|---|---|---|---|
| 23 | 2276 | 14 | 19.6 | 1.6958 | 169.6 | 1.30 | 0.366 | 451 | 0.7957 | 0.1036 | 21.28 | 11.13 | 8.0 | 26.69 | 7.56 | 17.7 |
| 24 | 1472 | 14 | 27.3 | 1.5184 | 167.5 | 1.03 | 0.530 | 301 | 0.8646 | 0.1910 | 34.69 | 18.74 | 8.0 | 41.68 | 12.04 | 16.7 |
| D | 2000 | 0 | 21.3 | 1.6840 | negligible | | 1.913 | 205 | 1.7833 | 0.3222 | 38.86 | 21.53 | 8.7 | 17.63 | 1.20 | 69.0 |

TABLE 5

| Ex. No. | Soft Segment Mn | % Methyl | % HS | Inh. Visc. (dl/g) | H.S. Tm (° C.,) onset | H.S. ΔH (J/g) | T (gpd) | E (%) | Toughness (gpd) | Initial Mod. (gpd) | $UP^{100/50}$ | $UP^{100/33}$ | % Set 100 | $UP^{200/100}$ | $UP^{200/50}$ | % Set 200 |
|---|---|---|---|---|---|---|---|---|---|---|---|---|---|---|---|---|
| 25 | 2276 | 14 | 27.2 | 1.5511 | 132.5 | 8.90 | 0.795 | 325 | 1.2344 | 0.2536 | 52.38 | 28.68 | 7.0 | 46.14 | 8.61 | 30.0 |
| 26 | 2098 | 8 | 28.0 | 1.5363 | 119.6 | 17.85 | 1.159 | 273 | 1.5204 | 0.2784 | 64.86 | 35.15 | 5.7 | 39.13 | 4.16 | 46.0 |
| E | 2000 | 0 | 29.8 | 1.5499 | 121.1 | 16.37 | 1.877 | 212 | 1.8481 | 0.5430 | 44.38 | 12.11 | 23.7 | 4.80 | 1.50 | 111.0 |
| F | 2000 | 0 | 29.8 | 1.3189 | 150.5 | 6.10 | 0.810 | 386 | 1.4187 | 0.3910 | 21.21 | 4.85 | 24.0 | 4.96 | −0.45 | 93.7 |

TABLE 6

| Ex. No. | Soft Segment Mn | % Methyl | % HS | Inh. Visc. (dl/g) | H.S. Tm (° C.,) onset | H.S. ΔH (J/g) | T (gpd) | E (%) | Toughness (gpd) | Initial Mod. (gpd) | $UP^{100/50}$ | $UP^{100/33}$ | % Set 100 | $UP^{200/100}$ | $UP^{200/50}$ | % Set 200 |
|---|---|---|---|---|---|---|---|---|---|---|---|---|---|---|---|---|
| 27 | 3635 | 14 | 19.2 | 1.7143 | 199.0 | 5.36 | 1.157 | 218 | 1.3110 | 0.3297 | 46.63 | 21.37 | 9.3 | 30.76 | 3.69 | 30.0 |
| 28 | 3635 | 14 | 18.4 | 1.7874 | 200.1 | 3.97 | 0.641 | 211 | 0.6893 | 0.1717 | 26.08 | 11.93 | 8.0 | 23.09 | 4.07 | 30.3 |
| 29 | 2098 | 8 | 28.6 | 1.6714 | 181.7 | 1.64 | 0.329 | 280 | 0.4313 | 0.0620 | 24.49 | 14.54 | 6.7 | 28.48 | 9.9 | 20.0 |
| G | 2000 | 0 | 29.3 | 1.7001 | 178.3 | 2.67 | 2.5704 | 138 | 137.72 | 2.0704 | 7.60 | 7.60 | 54.0 | | | |

EXAMPLES 30–31 AND COMPARATIVE EXAMPLE H

Using an experimental setup identical to the one described in Example 11, a series of elastomers was prepared wherein the hard segment was formed in situ. Comparative Example I is used to illustrate the general procedure. A resin kettle was charged with 4.30 g (37.0 mmol) 1,6-hexanediamine, 17.03 g (73.9 mmol) 1,12-dodecanedioic acid, 70.45 g (35.2 mmol) of a Mn=2000 g/mol PTMEG, 0.40 g Ethanox® 330 antioxidant, and 0.184 g (0.2 wt. %) butyl stannoic acid catalyst. The flask was evacuated and backfilled with N₂ gas three times to create an inert atmosphere. The reaction was heated for one h at 210° C. and then 90 min at 235° C. under N₂. At that point vacuum was applied, lowering the pressure from atmospheric to 1.3–5.2 Pa over 90 min. The reaction was continued under vacuum at 235° C. until the torquemeter reached a predefined value. The flask was backfilled with N₂ and the polymer was removed while still hot. Isolated yields typically ranged from 75–90%.

TABLE 7

| Ex. No. | HS of Ex. | Soft Segment Mn | % Methyl | % HS | Inh. Visc. (dl/g) | H.S. Tm (°C, onset) | H.S. ΔH (J/g) | T (gpd) | E (%) | Toughness (gpd) | Initial Mod. (gpd) | $UP^{100/}_{50}$ | $UP^{100/}_{33}$ | % Set 100 | $UP^{200/}_{100}$ | 200/50 | % Set 200 |
|---|---|---|---|---|---|---|---|---|---|---|---|---|---|---|---|---|---|
| 30 | 5 | 2098 | 8 | 20.2 | 1.8903 | 199.2 | 4.81 | 0.3169 | 426 | 0.6158 | 0.1097 | 16.38 | 7.18 | 12.7 | 13.9 | 2.61 | 34.3 |
| 31 | 9 | 1472 | 14 | 35.7 | 1.6318 | 182.8 | 1.90 | 1.3929 | 92 | | | | | | | | |
| H | 5 | 2000 | 0 | 21.0 | 1.8124 | 199.1 | 5.62 | 2.1471 | 162 | 1.9122 | | | 8.03 | 2.57 | 53.3 | | |

Although particular emobidiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

What is claimed is:

1. A polymer, comprising, the repeat units:

(a) $-R^2C(O)O\{[-(CH_2)_4O-]_m[-CH_2CHR^1CH_2CH_2O-]_n\}C(O)R^2-$ (I); and (b) one or both of (i) $-C(O)[-NHR^3NHC(O)R^2C(O)-]_qHNR^3NHC(O)-$ (II), and (ii) $-C(O)[-NHR^4C(O)-]_rNH-$ (III);

wherein:

each $R^1$ independently is an alkyl containing 1 to 6 carbon atoms;

each $R^2$, $R^3$ and $R^4$ independently is saturated hydrocarbylene or substituted saturated hydrocarbylene which independently contain 2 to 20 carbon atoms, or hydrocarbylidene or substituted hydrocarbylidene independently containing 1 to 20 carbon atoms;

m is an integer from 5 to about 150;

n is 0 or an integer of 1 to about 50, provided that the overall ratio of m/n in said polymer is about 3 to about 30;

q is 0 or an integer of 1 to about 20; and t is 0 or an integer of 1 to about 20.

2. The polymer as recited in claim 1 wherein $R^1$ is methyl.

3. The polymer as recited in claim 1 or 2 wherein each $R^2$, $R^3$ and $R^4$ is independently saturated hydrocarbylene.

4. The polymer as recited in claim 1 or 2 wherein m is about 7 to about 50, and said ratio is about 4 to about 20.

5. The polymer as recited in claim 1 or 2 wherein (II) or (III) is present.

6. The polymer as recited in claim 5 wherein $R^2$ is 1,10-decylene and $R^3$ is 1,6-hexylene, or $R^2$ is 1,4-butylene and $R^3$ is 1,10-decylene.

7. The polymer as recited in claim 1 wherein a branching agent is present.

8. The polymer of claim 1 in the form of a fiber.

9. The polymer of claim 2 in the form of a fiber.

* * * * *